(No Model.)  2 Sheets—Sheet 1.
W. E. PRALL.
MEANS FOR SUPPLYING HEAT AND POWER TO LARGE DISTRICTS OF BUILDINGS.
No. 382,383.  Patented May 8, 1888.
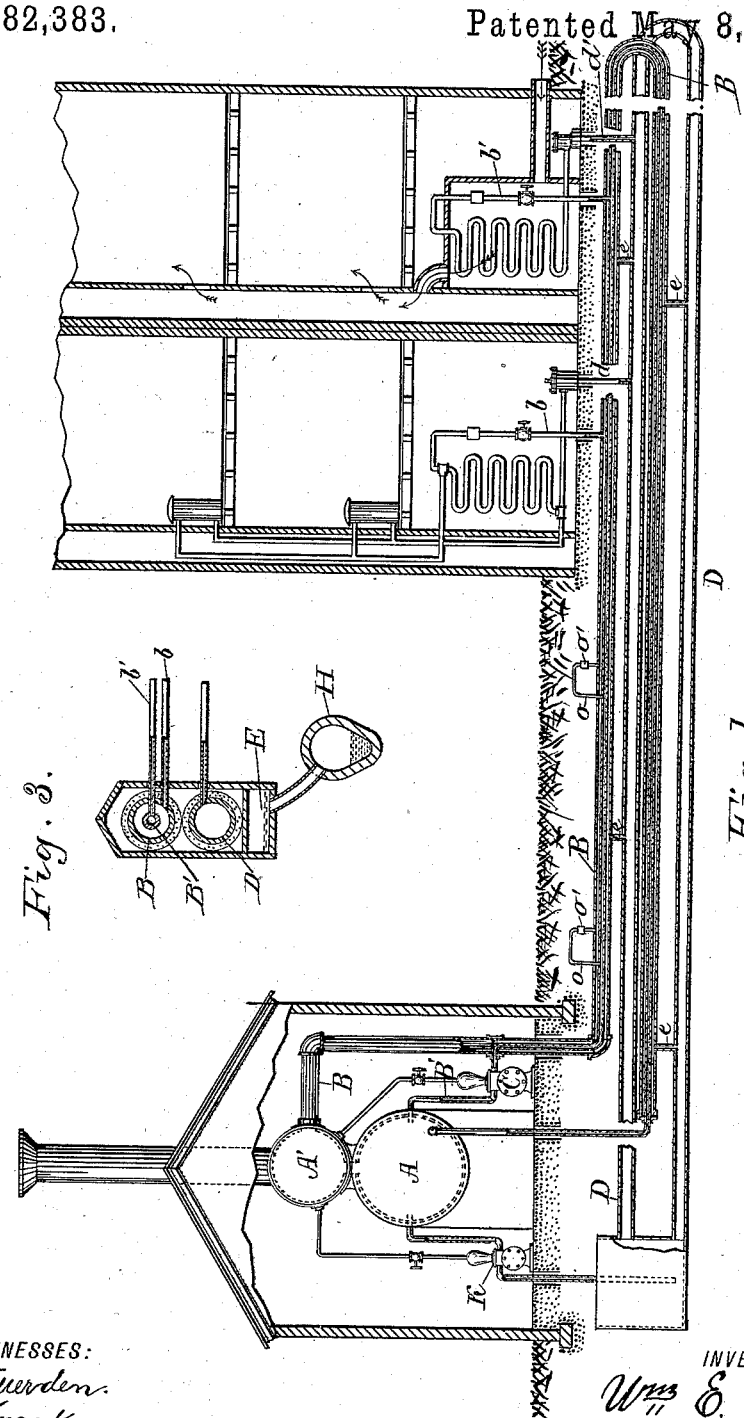
WITNESSES:
R. L. Duerden.
F. C. E. Knaak.
INVENTOR.
Wm E. Prall,
BY
W. W. Canfield,
ATTORNEY.

(No Model.) 2 Sheets—Sheet 2.
W. E. PRALL.
MEANS FOR SUPPLYING HEAT AND POWER TO LARGE DISTRICTS OF BUILDINGS.
No. 382,383. Patented May 8, 1888.
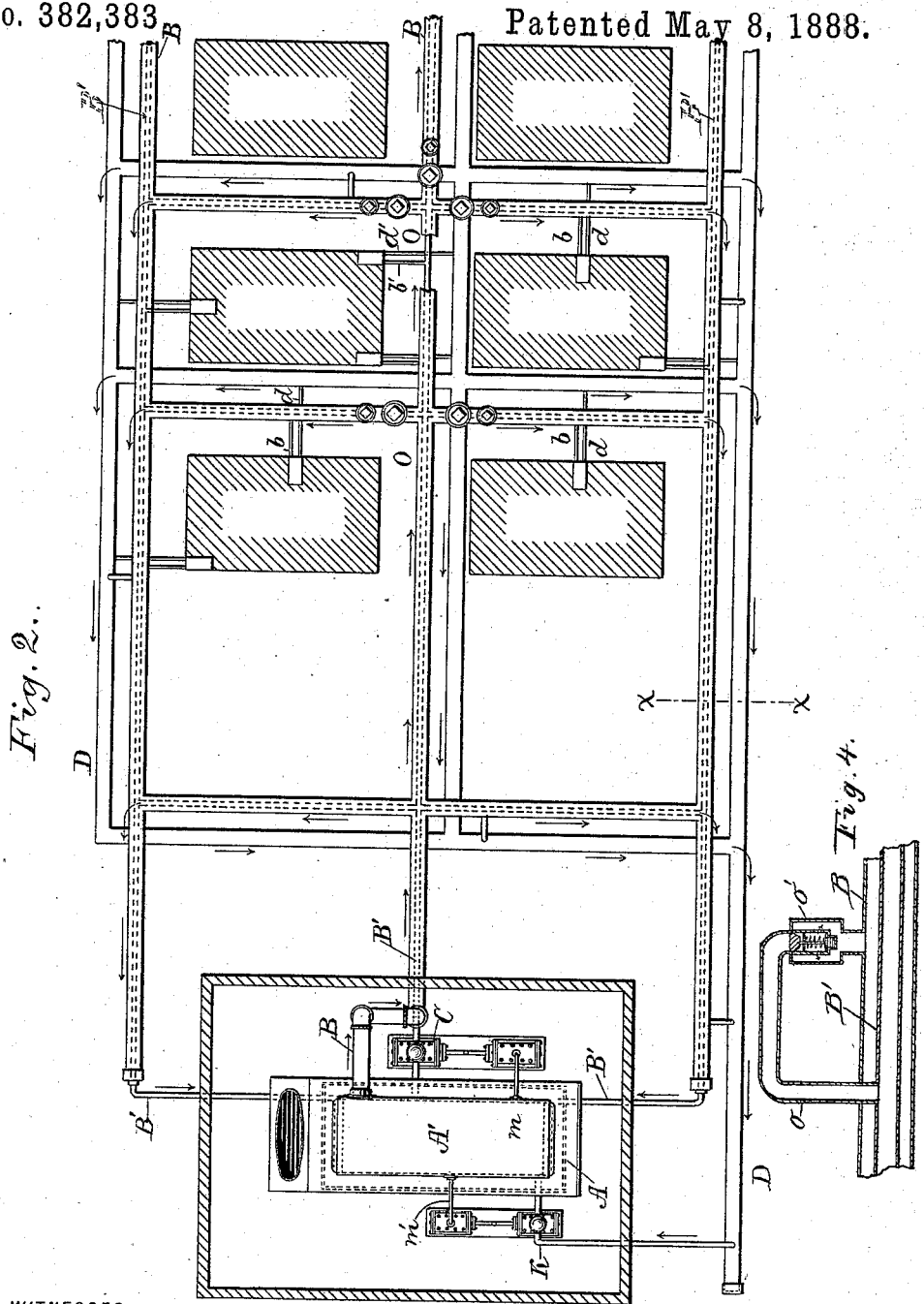
WITNESSES:
L. L. Duerden.
Fr. H. F. Knaak.
INVENTOR.
Wm. E. Prall,
BY
W. W. Canfield,
ATTORNEY.

UNITED STATES PATENT OFFICE.

WILLIAM E. PRALL, OF WASHINGTON, DISTRICT OF COLUMBIA, ASSIGNOR TO THE NATIONAL HEATING COMPANY, OF NEW YORK, N. Y.

MEANS FOR SUPPLYING HEAT AND POWER TO LARGE DISTRICTS OF BUILDINGS.

SPECIFICATION forming part of Letters Patent No. 382,383, dated May 8, 1888.

Application filed January 21, 1888. Serial No. 261,448. (No model.) Patented in England July 23, 1879, No. 2,987, and in Germany January 27, 1880, No. 13,525.

*To all whom it may concern:*

Be it known that I, WILLIAM E. PRALL, a citizen of the United States, and a resident of Washington, in the District of Columbia, have invented certain new and useful Means for Supplying Heat and Power to Large Districts of Buildings in Cities and Towns, (for which I have obtained a patent in Great Britain, dated July 23, 1879, No. 2,987, and also in Germany, No. 13,525, dated January 27, 1880,) of which the following is a specification.

This invention relates to a novel means of supplying heat and power to large districts of buildings in cities and towns, steam and superheated water being used as heat and power conveying mediums, and to the manner of utilizing and distributing the same from one common source of supply, and embodies a safe, economical, convenient, and healthful system of delivering and controlling the heat in each and every building and compartment therein, and of supplying motive power for stationary and other engines.

In the accompanying drawings, forming part of this specification, in which similar letters indicate like parts wherever found, Figure 1 is a view, partly in section, of a heating-station containing a boiler or heater and pumps, &c., also circulating mains, and a building fitted with radiators and other appliances in communication with the circulating-mains. Fig. 2 is a plan view of the heater, circulating-pumps, and the circulating-mains for conveying the heating medium through the different streets and returning the same to the heater, together with the manner in which connection is made with the buildings where heat or power is required. Fig. 3 is a cross-section on the line X X of Fig. 2, showing the arrangement of the mains in the conduit and means for draining the conduit. Fig. 4 is a detail view of certain features of my construction.

A represents the heater or boiler, and should be of sufficient capacity to furnish all the heat or power required in the district reached by the circulating - mains. This heater is provided with a constant supply of water by means of a pumping - engine from any convenient source in such quantities as is needed to keep up the waste from the mains, or supply the place of water or steam drawn from the same for any purpose whatever. The power for driving the pumping-engine may be taken from steam generated in the water-heater, or it may be taken from any other boiler erected for that purpose. It is evident that there may be several of the water-heaters employed for the purpose of supplying water or steam for circulation, and they may all be connected, or they may be separated by means of cocks placed in the connecting-pipes, so that one or more may be used independent of the others.

B is a steam-circulation main in communication with a steam-drum, A', and extends throughout the entire district to be heated. B' is a hot-water pipe within the steam-main B, connected with the heater A at a point below the water-line, and extends within said main B throughout the district, and the return end is also in communication with the heater or boiler below the water-line. This pipe B' is provided with a force pump, C, by which the water is circulated through said pipe. With this construction the steam-main B may receive steam from the boiler and convey it throughout the district, or it may receive water from the pipe B' by means of automatic valves for evaporation, the water in said pipe being heated much above the steam-generating point—for example, to 400°—or this plan may be adapted to the re-evaporation of the condensed water formed in the steam-main when such main is used to convey steam from the boiler, the heat of said pipe being amply sufficient for this purpose, and thus the temperature and pressure of the steam in the main would be maintained for a great distance, and thereby all trouble from the collection of condensed water in said main would be avoided.

In Fig. 1 I have shown at *o* a pipe provided with an automatic valve, *o'*, by means of which superheated water is conveyed from the water-pipe B' to the steam-main B, as above stated, the construction of said valve being such that it will open at a certain predetermined pressure of the superheated water and close whenever the pressure of the steam in the main B is greater than that of the water in the pipe B'.

Any properly-constructed fluid-pressure regulating-valve will serve the purpose, this feature of construction, except in the combination shown, forming no part of my invention. The steam-main B, water-pipe B', and the connecting-pipe o, with its valve o', are shown on an enlarged scale in Fig. 4.

My invention is not limited to the location of the water-pipe within the steam-main, as shown, as it is evident that said main and pipe may be placed simply in contact or contiguous to each other. The form shown, however, is preferred, as in that position the heat from the superheated water-pipe operates most directly to maintain the steam in the main B at high pressure and to re-evaporate the water of condensation formed therein.

With this system, as before stated, either steam may be taken from the steam-main by means of a pipe, b, as indicated in the first building shown in Fig. 1, and circulated through coils or radiators, or both, or hot water may be taken from the pipe B' by means of a pipe, b, as in the second building of said figure, and circulated as in the first instance. The water of condensation, if steam be used, or the water from pipe B', after its temperature has been reduced by circulation through the coils or radiators, may be discharged as waste water into a waste pipe or sewer, or it may be returned by means of pipes d and d' to a return-main, D, by which it is reconveyed to the heater. This return-main also extends throughout the circuit of the supply-main and is laid in the same conduit, as shown in Fig. 3, said conduit being provided with a channel, E, which is in communication with the street-sewer H, whereby any leakage or other water that may collect in the conduit is conveyed to the sewer. Should the condensation in main B, when steam is taken from the boiler A, form water faster than could be re-evaporated by transmitted heat from the hot-water pipe B, I contemplate drawing it off from the steam-main by branch pipes e, connected therewith at all the lower points, and convey it to the return-main D, each end of which is in communication with a pump, K, by which the return-water is reconveyed to the boiler, where it is reheated for the purpose of recirculation and the generation of steam. In this manner all the water of condensation, whether formed in the steam-main or radiators, and the water taken from pipe B and circulated for heating purposes, as before stated, are returned to the heater, and the steam-main is left free for the passage of steam.

If water is taken from pipe B, as indicated in the second building in Fig. 1, it may be converted into steam or circulated as hot water for heat or power purposes, as shown and described in my applications Serial Nos. 258,464 and 258,465, filed December 20, 1887. This feature, however, forms no part of the invention claimed herein.

In Fig. 2 I have shown a plan for circulating hot water and steam around several blocks of buildings and means for controlling the flow in each and every section, and also a system of return-pipes connected with the steam and hot-water pipes by the connecting-pipes from the radiators in the buildings, and connections between the steam and water-supply mains and pipes and the return-pipes may be made at the junctions of the streets, if required. In this view m represents the pipe which supplies the steam-pump C, by which the water is circulated through the supply-pipe B', and m' a pipe which supplies the pump K, by which the return-water from pipe D is forced into the heater, the circulation in the supply and return mains and pipes being as indicated by the arrows. It is evident that by means of cocks or valves at the connections O the circulation in any of the cross-pipes may be cut off or controlled. It is also evident that very little water would be wasted from the pipes, as all the condensed water would be returned for reheating, and the amount so wasted may be supplied from any convenient source, as hereinbefore stated, and as shown in my applications herein referred to. It is also evident that a force-pump may be employed wherever required to cause a circulation in the return-pipe, and that the pump C may be placed at either end of the supply-pipe B'.

In the practical operation of this invention the heaters should be located in a suitable building convenient to the district to be supplied with heat and power. The circulating-pump C will take the water, which is superheated or heated above 212°, for example, to 350° or 400° under pressure, and will be kept operating with sufficient rapidity to cause a rapid and regular flow of water throughout the entire length of pipe B', and the temperature of the water in said pipe will thus be kept about the same as that in the heater.

The covering for the street-supply and return mains and pipes to prevent as much as possible the radiation of heat therefrom, the expansion-joints to allow for the expansion of the supply mains and pipes longitudinally, the metering of the hot water or steam within the buildings, and many other details form no part of the invention claimed in this application, and are not therefore shown and described in full. A portion of these features of construction are such as are well known in this art, while others are shown and described in my prior applications hereinbefore referred to.

Having thus fully described my invention, its construction, and mode of operation, what I claim, and desire to secure by Letters Patent of the United States, is—

1. In a central-station heat and power system, the combination of a heater, a superheated water main or pipe extending from and returning to the heater, a steam-main contiguous to the water-main, means for introducing steam into said steam-main, and means for causing a circulation in the water-main, substantially as shown and described.

2. In a central-station heat and power system, the combination of a heater, a superheated water-pipe extending from and returning to the heater, a steam-main contiguous to the water-pipe, the steam-main being in communication with the heater and with the water-pipe, and a radiator or other means for utilizing the steam in communication with the steam-main.

3. In a central-station heat and power system, the combination of a heater, a superheated water-pipe extending from and returning to the heater, a force-pump connected with said pipe, a steam-main contiguous to said pipe, means for introducing steam into said main, a radiator or other means for utilizing the steam in communication with said main, and means for returning the water of condensation to the heater.

4. In a central-station heat and power system, the combination of a heater, a superheated water-pipe leading from and returning to the heater, a steam-main contiguous to the water-pipe in communication with the heater and with the water-pipe, a radiator or other means for utilizing the steam, a return-pipe in communication with the heater for returning the water of condensation to the heater, and pipes forming communications between the steam-main and return-pipe, substantially as shown and described.

5. In a central-station heat and power system, the combination of a heater, a superheated water-pipe and steam-main, one of which is placed within the other, the steam-main being in communication with the heater and superheated water-pipe, and a radiator or other means for utilizing the steam, substantially as shown and described.

6. In a central-station heat and power system, the combination of a heater, a superheated water-pipe leading from and returning to the heater, a steam-main contiguous to said pipe, means for introducing steam into said main, and radiators or other means for utilizing the steam and hot water in communication with both the steam-main and water-pipe, substantially as shown and described.

7. In a central-station heat and power system, the combination of a heater, a superheated water-pipe extending from and returning to the heater, a steam-main contiguous to said water-pipe, means for introducing steam into said main, radiators or other means for utilizing the steam and hot water in communication with both the steam-main and hot-water pipes, and a system of return-pipes in communication with the heater, substantially as shown and described.

8. In a central-station heat and power system, the combination of a heater, a superheated water-pipe extending from and returning to the heater, a steam-main contiguous to the water-pipe, and in communication therewith a radiator or other means for utilizing the steam, and means for returning the water of condensation to the heater.

9. In a steam and hot-water heat and power system, the combination of a heater, a superheated water-pipe extending from and returning to the heater, a steam chamber or main in proximity to the water-main and in communication with the heater and the water-pipe, and a radiator or other means for utilizing the steam in communication with the steam-main, substantially as shown and described.

Signed at Washington, in the District of Columbia, this 13th day of January, A. D. 1888.

WM. E. PRALL.

Witnesses:
F. W. MOULTON,
H. W. UPPERMAN.